United States Patent
Bursey, Jr. et al.

[11] Patent Number: 5,230,570
[45] Date of Patent: Jul. 27, 1993

[54] HIGH PERFORMANCE ROLLING ELEMENT BEARING

[75] Inventors: Roger W. Bursey, Jr., Jupiter; John B. Olinger, Jr., Lake Park; Samuel S. Owen, Palm Beach Gardens, all of Fla.; William E. Poole, Prescott, Ariz.; David A. Haluck, Stuart, Fla.

[73] Assignee: United Technologies Corporation, Hartford, Conn.

[21] Appl. No.: 885,572

[22] Filed: May 19, 1992

[51] Int. Cl.⁵ .............................................. F16C 33/44
[52] U.S. Cl. .................................... 384/527; 384/528; 384/902; 384/908; 384/909; 384/912
[58] Field of Search ............... 384/527, 528, 573, 576, 384/572, 902, 911, 908, 912, 909

[56] References Cited

U.S. PATENT DOCUMENTS

| | | | |
|---|---|---|---|
| 2,550,911 | 5/1951 | Cobb | 384/527 |
| 2,550,912 | 5/1951 | Goodwin et al. | 384/528 |
| 2,712,481 | 7/1955 | Martin | 384/527 |
| 4,541,739 | 9/1985 | Allen et al. | 384/527 |

*Primary Examiner*—Lenard A. Footland

[57] ABSTRACT

A high performance rolling element bearing (5) which is particularly suitable for use in a cryogenically cooled environment, comprises a composite cage (45) formed from glass fibers disposed in a solid lubricant matrix of a fluorocarbon polymer. The cage includes inserts (50) formed from a mixture of a soft metal and a solid lubricant such as a fluorocarbon polymer.

9 Claims, 2 Drawing Sheets

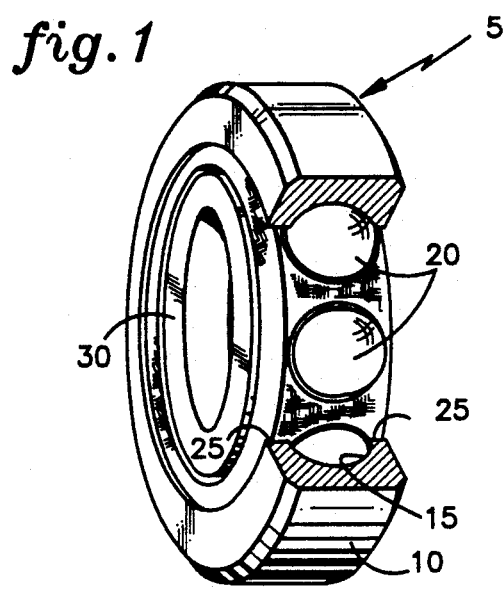
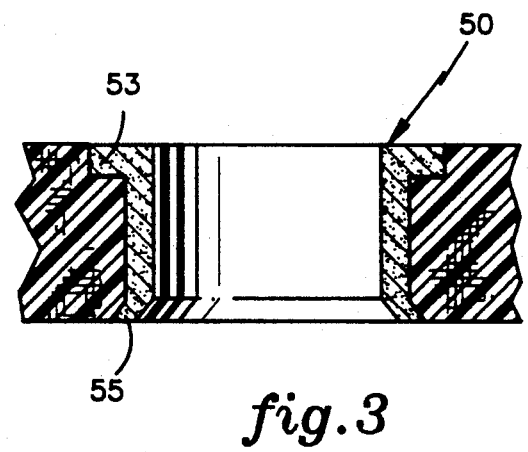
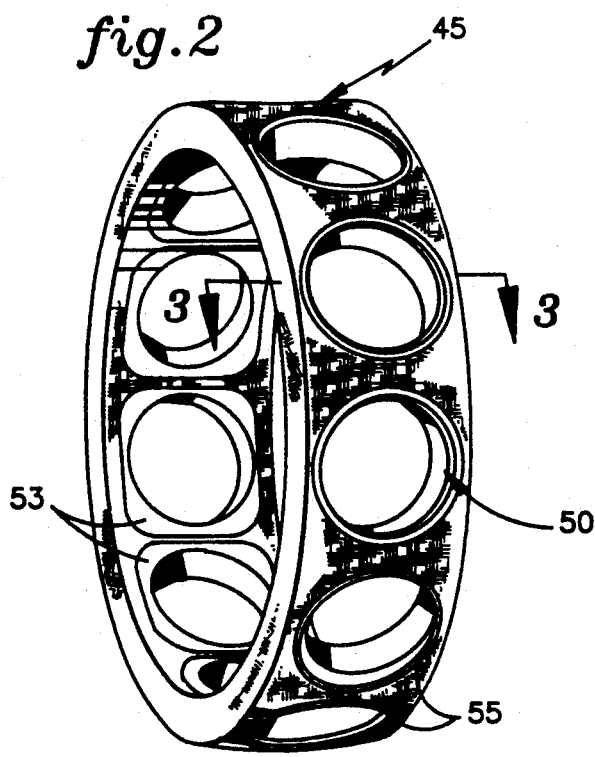

ure of a generally soft metal and a solid lubricant, each
HIGH PERFORMANCE ROLLING ELEMENT BEARING This invention was made with under Contract No. NAS8-36801 awarded by the National Aeronautics and Space Administration. NASA has certain rights in this invention.

TECHNICAL FIELD

This invention relates generally to high performance rolling element bearings, and particularly, to high speed cryogenic ball bearings.

BACKGROUND ART

Supporting the rotational shafts of such apparatus as motors, turbines and pumps, by ball bearings is well known. The impeller shafts of turbopumps employed in rocket engines are typically cooled by a flow of liquified (cryogenic) rocket propellant such as liquid oxygen or liquid hydrogen. Because such liquified fuels provide little, if any, lubricity, in such applications, it has been the practice to lubricate the ball bearings by sacrificially removing dry lubricant from the cage: the component which holds the balls, and depositing this lubricant by means of the balls onto the races in which the balls roll. The cage comprises hollow elements containing the lubricant, which accommodate the balls, attached to a metal shroud as by riveting. To minimize wear on the cage due to rubbing of the cage on the races as a result of high speed operation (tens of thousands of revolutions per minute) the cages are, for the most part, piloted on the inner race. That is, the inner race is provided with lands thereon, the cage being maintained in overall alignment with the bearing components by an extremely close fit with those lands. When a cage is piloted on an inner race in this manner, normal removal of cage material occurs, due to rubbing of the cage on the inner race lands. Factors such as cage weight, balance, orbital speed and land clearance as well as ball-to-cage loads, friction factors, coolant flow rates and coolant physical properties can contribute to such rub wear of the cage on the inner race lands which creates a very unstable condition. Such an instability occurs because cage wear removes material from the cage which further contributes to cage imbalances, thereby resulting in still further cage wear and still further imbalances and rubbing.

In an attempt to overcome the shortcomings of high cage wear rates in prior art cryogenic ball bearings, lighter weight shrouds have been employed in the cages to reduce centrifugal loading and rub wear, clearances between guide lands on the inner races and cage have been reduced to reduce rub forces, cages have been balanced with greater precision to enhance balance, and flow rates of coolant have been adjusted in an attempt to optimize the fluid dynamic forces associated therewith. However, while such modifications to prior art bearings have met with some success in increasing the life span of the bearing cages, they have not enabled prior art bearings to enjoy life spans long enough to render the bearings useful in multiple launch rocket engines anticipated in future commercial and military space vehicle and satellite launches.

DISCLOSURE OF INVENTION

The shortcomings associated with prior art cryogenic rolling element bearings noted hereinabove are overcome by a rolling element bearing provided with a laminar composite cage consisting of a lay-up of fibrous reinforcements in a matrix of solid lubricant, the cage accommodating a plurality of inserts comprising a mixture of a generally soft metal and a solid lubricant, each insert itself accommodating a single rolling element. In the preferred embodiment, the composite material employed in the cage comprises glass fiber reinforcements disposed within a matrix of a fluorocarbon polymer such as the commercially available, composite material, Armalon ®. The inserts comprise a mixture of bronze and a fluorocarbon polymer, such as the commercially available material Salox-M ®. The inserts are each received within a mating, counterbored aperture provided in the cage and include a preferably polygonal flange which is received within the counterbore and distributes centrifugal loading of the inserts to the composite material while preventing rotation of the inserts within the apertures. The inserts are preferably flared in situ within the cage apertures at ends of the insert opposite the flanges, for the secure attachment of the inserts to the cage.

BRIEF DESCRIPTION OF THE DRAWINGS

FIG. 1 is a perspective view of the high performance rolling element bearing of the present invention with portions thereof having been sectioned and broken away to show details of construction of the bearing;

FIG. 2 is a perspective view of the cage of the high performance bearing of the present invention;

FIG. 3 is a sectional view taken in the direction of line 3—3 of FIG. 2;

BEST MODE FOR CARRYING OUT THE INVENTION

Figure 4:
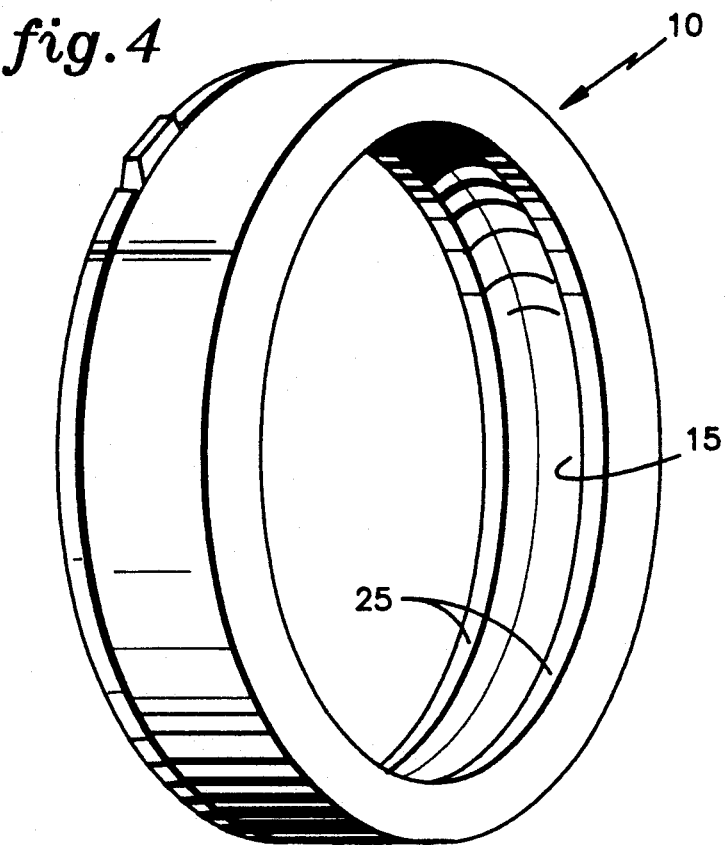
FIG. 4 is a perspective view of an outer race employed in the bearing of the present invention.

FIG. 1 shows a high performance cryogenic ball bearing 5 such as the type employed in rotatably supporting the impeller shaft of a cryogenically cooled turbopump used in rocket motors and the like. The bearing comprises an outer, generally cylindrical race 10 circumferentially grooved at 15 in the center portion of the inner surface thereof, to accommodate a plurality of balls 20. On either side of groove 15, outer race 10 is provided with a circumferential land 25 (see also FIG. 4). Lands 25 maintain the radial alignment of the bearing components disposed internally of race 10 and react the centrifugal loading applied to the race by the rotational components of the bearing.

Figure 5:
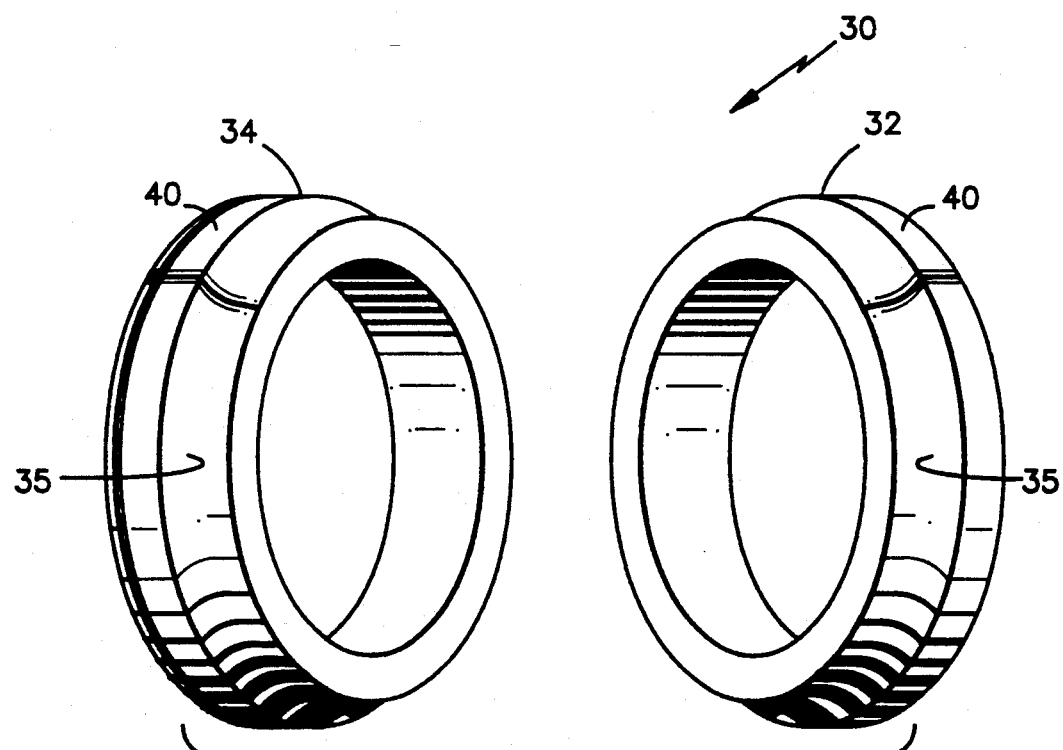
FIG. 5 is a perspective view of an inner race employed in the bearing of the present invention, the two component parts thereof being separated to show details of construction thereof.

An inner cylindrical race 30 is disposed internally of outer race 10 and generally concentric thereto. As best seen in FIG. 5, inner race 30 comprises two rings 32 and 34 for assembly of the remainder of the bearing components between the two races. The inner portion of each ring's outer surface is provided with a tapered section which when juxtaposed with each other, define a groove 35 in which balls 20 roll. The two rings may be locked together by any suitable mechanical lock (not shown) or held together by axially compressive forces applied to the bearing by adjacent components (not shown) in the apparatus in which the bearing is employed. The inner race is provided with lands 40 at opposite edges of groove 35 in the event inner piloting of the ball cage (which will be described hereinafter) is desired.

As those skilled in the art will readily appreciate, bearing 5 is employed in rotary equipment such pumps, motors, or generators by, for example, securing inner race 30 to a rotary shaft as by heat shrinking or the like and securing outer race 10 to a stationary supporting member by locking rings or other suitable fasteners, balls 20 providing rotational support of the shaft between the two races. The two races may be formed from any suitable material as will be dictated by operating parameters of the bearing such as the weight of the structure supported by the bearing, the rotational speed of the bearing, the temperature of bearing operation and lubrication flow through the bearing.

As shown in FIG. 1, balls 20 are received within a generally cylindrical cage 45. Cage 45 is formed from a composite lay-up of glass fibers in a matrix of solid lubricant such as polytetrafluoroethylene. The glass fiber/polytetrafluorthylene composite material is sold under the trademark Armalon ® by American Durofilm.

As best seen in FIGS. 2 and 3, the cage includes a row of circular apertures therethrough, uniformly spaced along the cage circumference. Each aperture accommodates an insert 50 comprising a mixture of bronze and polytetrafluorethylene. Each insert is generally cylindrical in shape and includes a polygonal flange 53 with rounded corners at one end thereof, each such flange being received within a mating counterbore in the composite portion of the cage. The flange uniformly applies the centrifugal loading of the inserts to the composite portion of the cage, the polygonal shape of the flange preventing the flange from rotating within the circular apertures. The composite end of the insert is flared in situ at 55 to axially (with respect to the insert) restrain the insert within the cage and ensure a tight, reliable fit therebetween. The bronze/polytetrafluorethylene material employed in the inserts is sold under the mark Salox-M ® by Industrial Plastics.

The high performance rolling element bearing of the present invention overcomes many of the shortcomings associated with prior art bearings. Due to the lightweight, high strength, and inherent lubricity of the composite material employed in cage 45, the cage shows very little wear due to rubbing against lands 25 in the outer race. In fact, it is this lack of rub wear which allows the bearing to be piloted on the outer race. As set forth hereinabove, the poor rub wear performance of prior art bearing cages, requires that the cages be piloted on the inner surfaces thereof—an inherently unstable arrangement. As those skilled in the art will appreciate, piloting the cage on the outer race lands is much more stable since, what little cage wear and resulting cage imbalance which does occur, does not contribute to the instability of the cage as it orbits around the lands. The inherent lubricity of the inserts lends the same selflubricating properties associated with the prior art bearings, to the bearing of the present invention. That is, during operation, the balls pick up lubricant from the inserts and deposit it on the races thereby preventing direct metal-to-metal contact between the balls and the races. Since the cage of the present invention exhibits the satisfactory lubricity of prior art bearings with the enhanced rub wear characteristics of the lightweight composite cage, this bearing has been found to be suitable for use in cryogenically cooled turbopumps such as those employed in liquid oxygen or liquid hydrogen fuel rocket motors. In fact, the cage of the bearing of the present invention has been found to be so durable that through testing, it has been determined that the structural integrity of the cage lends the bearing of the present invention a useful life longer than that necessary to survive fifty rocket engine operating cycles.

While a particular embodiment of the bearing of the present invention has been shown and described, it will be apparent that various modifications of the present invention may suggest themselves to those skilled in the art. For example, while particular materials have been noted for use in the bearing cage, it will be appreciated that other self-lubricating composite materials may be employed depending upon the operating parameters of the bearing. Likewise, while the inserts have been described as a mixture of bronze and polytetrafluoroethylene, various other mixtures of a metal and a solid lubricant may be employed as will be determined by the operating parameters of the bearings. Accordingly, it is intended by the following claims to cover any such modifications as well as all other equivalent structures and compositions as fall within the true spirit and scope of the invention herein.

Having thus described the invention, what is claimed is:

1. In a rolling element bearing comprising an outer race, an inner race concentric to said outer rice and disposed therewithin, a cage generally concentric to said inner and outer races and disposed therebetween, said cage having a plurality of spaced apertures, each accommodating a rolling element adapted for rolling contact with said inner and outer races, the improvement characterized by:

said cage comprising a laminar, composite structure consisting of a lay-up of fibrous reinforcements in a matrix of solid lubricant; and said apertures being lined with inserts comprising a mixture of a generally soft metal and a solid lubricant.

2. The rolling element bearing of claim 1 characterized by said fibrous reinforcements comprising glass fibers.

3. The rolling element bearing of claim 1 characterized by said solid lubricant matrix comprising a fluorocarbon polymer.

4. The rolling element bearing of claim 1 characterized by said soft metal comprising bronze and said insert solid lubricant comprising a fluorocarbon polymer.

5. The rolling element bearing of claim 1 characterized by:

said cage apertures being counterbored;

each of said inserts comprising a wall portion conforming to, and contiguous with said apertures in said cage; and each of said inserts including a flange extending radially outwardly of said wall portion with respect to a central axis thereof and received within said counterbores.

6. The rolling element bearing of claim 5 characterized by:

said rolling elements being generally spherical;

said wall portions of said inserts being generally cylindrical; and said insert flanges being generally polygonal in shape.

7. The rolling element bearing of claim 6 characterized by:

said counterbores being disposed in an interior surface of said cage whereby centrifugal loading of said inserts is accommodated by said cage, by the application of said loading to said cage by said flanges.

8. The rolling element bearing of claim 7 characterized by said inserts being formed in situ, within said cage.

9. The rolling element bearing of claim 8 characterized by said in situ formation of said inserts within said cage, being by flaring.

* * * * *